US007146700B1

(12) United States Patent
Darrah et al.

(10) Patent No.: US 7,146,700 B1
(45) Date of Patent: Dec. 12, 2006

(54) METHOD OF MANUFACTURING A PRESSURE DAMPER FOR A FLUID CONDUIT

(75) Inventors: Matthew D. Darrah, Royal Oak, MI (US); Glenn D. Fisher, Midwest City, OK (US)

(73) Assignee: Millennium Industries Angola LLC, Bad Axe, MI (US)

( * ) Notice: Subject to any disclaimer, the term of this patent is extended or adjusted under 35 U.S.C. 154(b) by 89 days.

(21) Appl. No.: 10/971,557

(22) Filed: Oct. 22, 2004

Related U.S. Application Data

(60) Provisional application No. 60/513,500, filed on Oct. 22, 2003.

(51) Int. Cl.
*B23P 17/00* (2006.01)
*B21J 5/04* (2006.01)

(52) U.S. Cl. ........................ 29/419.2; 29/421.1; 72/56; 72/61; 123/456

(58) Field of Classification Search ............... 29/421.1, 29/419.2, 888, 525.01, 525.13, 525.14; 138/26; 72/56, 61, 62, 58; 123/456, 470
See application file for complete search history.

(56) References Cited

U.S. PATENT DOCUMENTS 435,927 A 9/1890 Ginty
616,188 A * 12/1898 Hopkins ...................... 138/27
4,557,128 A * 12/1985 Costabile ....................... 72/62
5,845,621 A 12/1998 Robinson et al.
6,016,603 A * 1/2000 Marando et al. ........... 29/897.2
6,314,942 B1 11/2001 Kilgore et al.
6,431,149 B1 8/2002 Schwegler et al.
6,497,128 B1 * 12/2002 Canfield et al. ............... 72/61
6,629,650 B1 10/2003 Curran et al.
6,640,783 B1 * 11/2003 Braun et al. ................ 123/467
6,651,627 B1 * 11/2003 Zdroik et al. ............... 123/456
6,802,297 B1 * 10/2004 Braun et al. ................ 123/456
6,935,314 B1 * 8/2005 Zdroik et al. ............... 123/456
7,028,668 B1 * 4/2006 West et al. ................. 123/456

FOREIGN PATENT DOCUMENTS

EP 1150003 A1 * 10/2001

* cited by examiner

*Primary Examiner*—Jermie E. Cozart
(74) *Attorney, Agent, or Firm*—Dykema Gossett PLLC

(57) ABSTRACT

A pressure damper for use with a fluid conduit, such a fuel rail in a vehicular fuel delivery system, is manufactured by deforming a workpiece, such as by stamping, hydroforming, or magnetic pulse forming, to have an enlarged portion of predetermined size and reduced wall thickness. The predetermined size and reduced wall thickness of the enlarged portion correspond to a magnitude of fluid pressure at which the enlarged portion will flex or otherwise behave elastically, allowing the enlarged portion to function as a pressure damper. The workpiece can be secured to a fuel rail, such as by brazing, quick-connects, O-ring joints, welding, gluing, or magnetic pulse forming or welding techniques. Alternatively, the workpiece is embodied as the fuel rail itself, and the pressure damper is formed integrally with the fuel rail, thereby eliminating the need to secure a separate damper to a fuel rail.

11 Claims, 5 Drawing Sheets

METHOD OF MANUFACTURING A PRESSURE DAMPER FOR A FLUID CONDUIT

CROSS-REFERENCE TO RELATED APPLICATIONS

This application claims the benefit of United States Provisional Application No. 60/513,500, filed Oct. 22, 2003, the disclosure of which is incorporated herein by reference.

BACKGROUND OF THE INVENTION

This invention relates in general to conduits for delivering fluids from one location to another. In particular, this invention relates to an improved method of manufacturing a pressure damper for use with such a fluid conduit for reducing or eliminating transient pulses of fluid pressure that may be generated in the fluid being delivered therethrough.

Most engines, such as internal combustion engines and diesel engines that are used in vehicles and other devices, are equipped with a system for delivering fuel from a source or reservoir to a plurality of combustion chambers provided within the engine. In most modern vehicular engines, this fuel delivery system is a fuel injection system, wherein fuel is supplied under pressure to and is selectively injected within each of the combustion chambers of the engine for subsequent combustion.

To accomplish this, a typical fuel injection system includes one or more fluid conduits (typically referred to as fuel rails) that transmit the fuel from the source to each of the combustion chambers of the engine. Each of the fuel rails is usually embodied as a hollow tube including an open end, a closed end, and a plurality of nodes located between the open and closed ends and that extend outwardly from the hollow tube. The open end of the fuel rail is adapted to communicate with the source of the fuel. The hollow tube is shaped such that each of the nodes is positioned directly adjacent to an inlet of an associated one of the combustion chambers of the engine. Each of the nodes usually terminates in a hollow cylindrical cup portion that is adapted to receive a fuel injector therein. The fuel injectors are typically embodied as solenoid controlled valves that are selectively opened and closed by an electronic controller for the engine. When opened, the fuel injectors permit the pressurized fuel to flow from the fuel rail into the associated combustion chamber. When closed, the fuel injectors prevent the pressurized fuel from flowing from the fuel rail into the associated combustion chamber. By carefully controlling the opening and closing of the fuel injectors, precisely determined amounts of the fuel can be injected under pressure from the fuel rail into each of the combustion chambers at precisely determined intervals.

Typically, the fuel rails are formed from a rigid material, such as a plastic or metallic material. Plastic material fuel rails can be formed by injection molding and other well known processes. However, the majority of fuel rails are manufactured from metallic materials. Typically, a metallic fuel rail is manufactured by initially providing a tubular body portion that is bent or otherwise deformed to a desired shape. Then, a plurality of openings are formed through the hollow body portion at the locations where it is desired to provide the above-mentioned nodes. A hollow node portion (typically having the cup portion already formed therein) is next positioned adjacent to each of the openings and is secured thereto, such as by brazing.

In fuel rails for most vehicular and other fuel injection systems, the various devices associated with the fuel system can cause transient pulses of fluid pressure to propagate throughout the fuel rails. These transient pressure pulses can undesirably cause varying amounts of the pressurized fuel to be injected from the fuel rail into the associated combustion chamber when the fuel injectors are opened. In addition, such transient pressure pulses can cause undesirable noise to be generated by the fuel delivery system. The transient pressure pulses can further result in false fuel pressure readings being taken by fuel pressure regulators, which may result in fuel being bypassed and returned to the fuel tank.

To address these problems, it is known to incorporate a pressure damper in a typical vehicular fuel delivery system. In one known pressure damper, a wall that forms a portion of a fuel supply line is formed from a flexible material. As pressure pulses occur within the fuel supply line, the flexible wall expands and contracts to dampen the magnitude of the pressure pulses. In another known pressure damper, a spring-loaded mechanism is provided within or connected to a portion of a fuel rail for the same purpose. In a further known pressure damper, a compliant member is provided within the fuel rail, again for the same purpose. Although known pressure dampers have been effective, it would be desirable to provide an improved method for manufacturing such a pressure damper that is simple and inexpensive in manufacture and construction.

SUMMARY OF THE INVENTION

This invention relates to an improved method of manufacturing a pressure damper for use with a fluid conduit, such a fuel rail in a vehicular fuel delivery system, for reducing or eliminating transient pulses of fluid pressure that may be generated within the fluid being passed therethrough. Initially, a tubular workpiece is provided. The workpiece is then deformed, such as by stamping, hydroforming, or magnetic pulse forming, to have an enlarged portion of predetermined size and wall thickness. The predetermined size and wall thickness of the enlarged portion correspond to a magnitude of fluid pressure at which the enlarged portion will flex or otherwise behave elastically. The predetermined size and wall thickness of the enlarged portion correspond to a predetermined magnitude of fluid pressure that is necessary within the workpiece to cause the enlarged portion to deform and thereby act as a pressure damper. Lastly, the workpiece is secured to a fuel rail, such as by brazing, quick-connects, O-ring joints, welding, gluing, or magnetic pulse forming or welding techniques. In an alternate embodiment, the workpiece is embodied as the fuel rail itself. Thus, the pressure damper is formed integrally with the fuel rail, thereby eliminating the need to secure a separate damper to a fuel rail.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
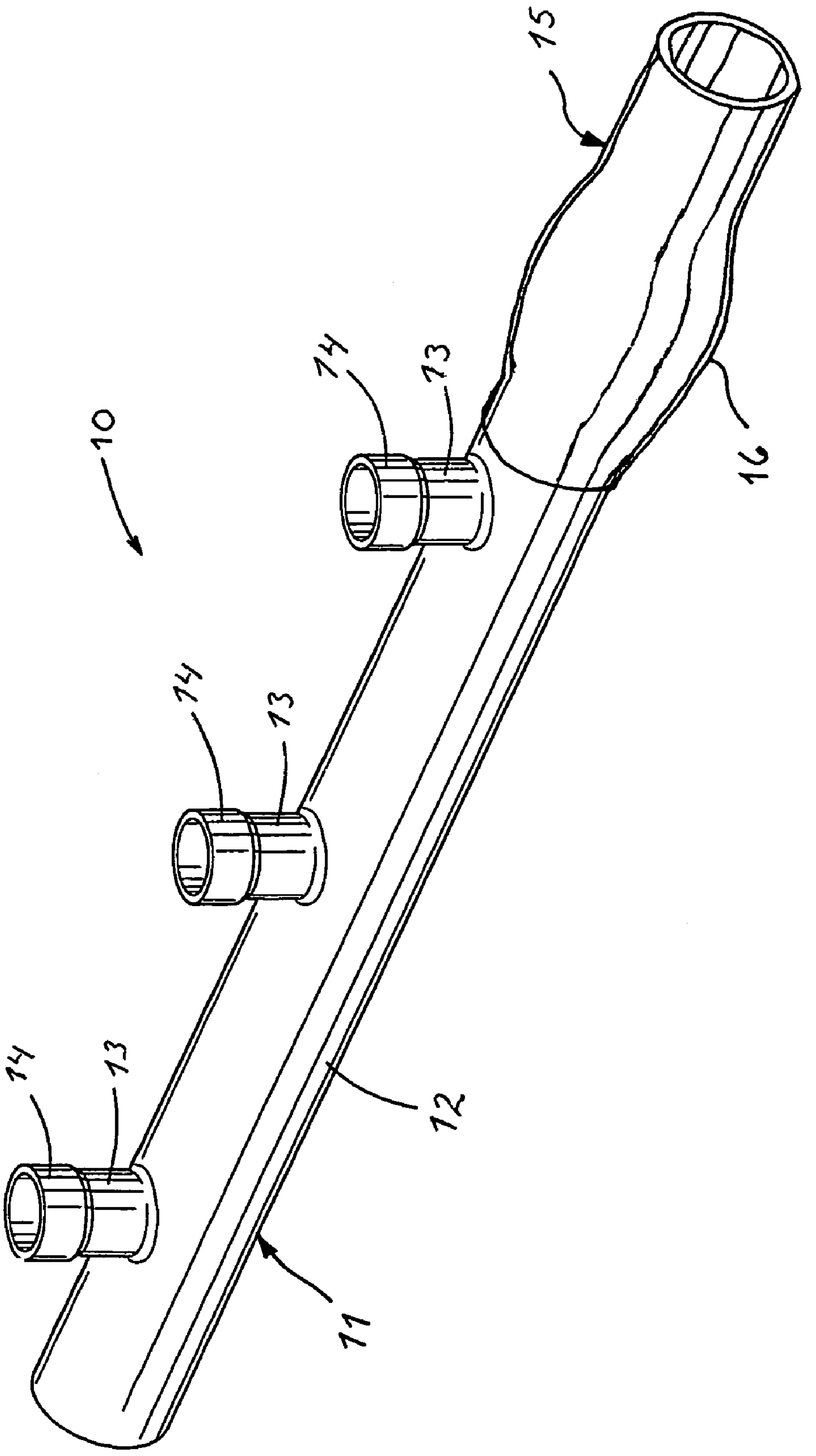
FIG. 1 is a perspective view of a combined fuel rail and pressure damper assembly that has been manufactured in accordance with a first embodiment of the method of this invention.

Referring now to the drawings, there is illustrated in FIG. 1 a combined fuel rail and pressure damper assembly, indicated generally at 10, that has been manufactured in accordance with the method of this invention. Although this invention will be described and illustrated in the context of a fuel rail and pressure damper assembly, it will be appreciated that this invention can be practiced in connection with any conduit for passing fluids from one location to another.

The illustrated combined fuel rail and pressure damper assembly 10 includes a fuel rail portion, indicated generally at 11, having a hollow body 12 and a plurality of nodes 13 extending outwardly from the hollow body 12. Each of the nodes 13 terminates in an enlarged cup 14 that is adapted to receive a portion of a conventional fuel injector (not shown) therein in a known manner, although such is not required. It will be appreciated that the method of this invention is not intended to be limited to the specific configuration of the illustrated fuel rail portion 11, but rather can be used to manufacture a pressure damper to designed to cooperate with a fuel rail having any desired configuration.

The illustrated combined fuel rail and pressure damper assembly 10 also includes a pressure damper portion, indicated generally at 15, that is secured to the fuel rail portion 11 using any conventional process, such as by brazing, quick-connects, O-ring joints, welding, gluing, or magnetic pulse forming or welding techniques, as will be described below. The pressure damper portion 15 is generally hollow and is communicably connected to the hollow body 12 of the fuel rail portion 11 such that fluid may be transmitted through the pressure damper portion 15 into the fuel rail portion 11.

The pressure damper portion 15 has an enlarged region 16 formed therein that has a predetermined size and wall thickness. This predetermined size and wall thickness allows the enlarged region 16 of the pressure damper portion 15 to flex or otherwise behave elastically under certain pressure conditions, pressure conditions that would not normally cause the other regions of the pressure damper portion 15 or the fuel rail portion 11 to behave elastically. Specifically, the size and wall thickness of the enlarged region 16 of the pressure damper portion 15 are selected so that the enlarged region 16 flexes or otherwise behaves elastically when it is subjected to fluid pressure of a predetermined magnitude. In a preferred embodiment, the enlarged region 16 of the pressure damper portion 15 has a larger diameter and a thinner wall thickness than the remainder of the pressure damper portion 15 and, for that matter, the fuel rail portion 11.

This predetermined magnitude of pressure is preferably determined to be the amount of fluid pressure within the pressure damper portion 15 that is necessary to cause deformation of the enlarged region 16 of the pressure damper 15 relative to the other regions of the pressure damper portion 15 or the fuel rail portion 11. This predetermined magnitude of pressure is preferably selected to be higher than the normal fluid pressure created by transmission of fluid through the combined fuel rail and pressure damper assembly 10. The predetermined magnitude of pressure can be selected to be the pressure magnitude of the fluid pulse pressure waves that may be transmitted into the combined fuel rail and pressure damper assembly 10 and undesirably affect the operation of the fuel injectors, as described above. The deformation of the enlarged region 16 of the pressure damper portion 15 under the predetermined magnitude of pressure is desirable because such deformation functions to dampen fluid pulse pressure waves transmitted through the enlarged region 16 of the pressure damper portion 15. Thus, the enlarged portion 16 of the pressure damper portion 15 acts as a damper for fluid pulse pressure waves entering the combined fuel rail and pressure damper assembly 10.

Figure 2:
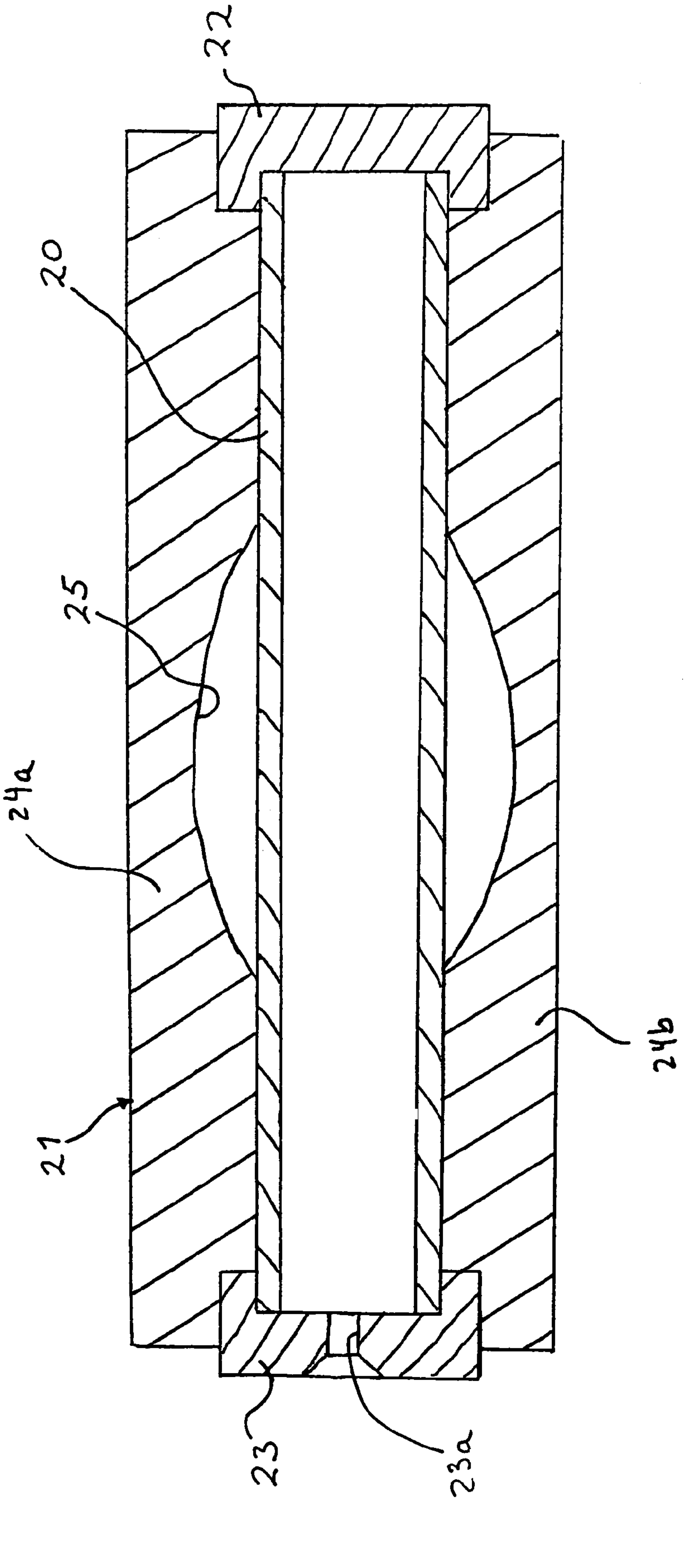
FIG. 2 is a sectional elevational view of a workpiece disposed within a hydroforming die assembly shown prior to being deformed in accordance with a first step of the method of this invention.
Figure 3:
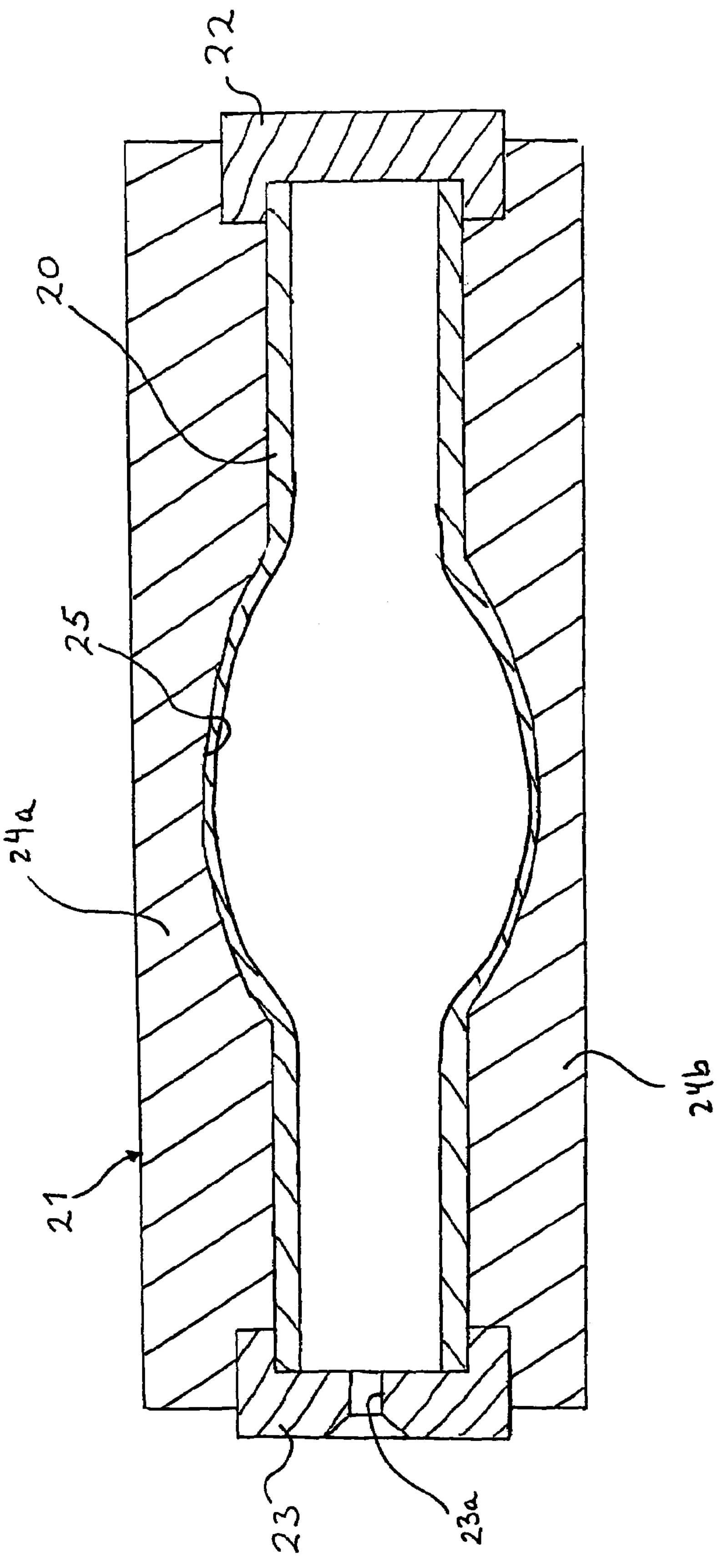
FIG. 3 is a sectional elevational view of a workpiece disposed within a hydroforming die assembly shown after being deformed in accordance with a second step of the method of this invention.

Referring now to FIGS. 2 and 3, a preferred method for manufacturing the pressure damper portion 15 of the combined fuel rail and pressure damper assembly 10 is illustrated. Initially, as shown in FIG. 2, a workpiece 20 is disposed within a hydroforming die assembly, indicated generally at 21. The workpiece 20 is preferably formed from a metallic material, such as steel. However, the workpiece 20 may be formed from any desired material. The workpiece 20 may have a thickness that is approximately equal to the desired final wall thickness of the pressure damper portion 15 to be manufactured, although such is not required. In a preferred embodiment, the workpiece 20 has a uniform wall thickness. However, the workpiece 20 may be formed having any desired shape or wall thickness and may be formed from any suitable material.

The hydroforming die assembly 21 may include a first end feed cylinder 22 or other structure for sealing one end of the workpiece 20. The hydroforming die assembly 21 may also include a second end feed cylinder 23 or other structure for sealing the other end of the workpiece 20. Preferably, the second end feed cylinder 23 has a passageway 23*a* formed therethrough that allows high pressure fluid to be fed into the workpiece 20 during the hydroforming process, as is well known in the art. The hydroforming die assembly 21 also includes at least one forming die, such as die sections 24*a* and 24*b*, for surrounding and controlling the expansion of the workpiece 20 during the hydroforming process. The illustrated hydroforming die sections 24*a* and 24*b* together define an internal die cavity 25. The size and configuration of hydroforming die assembly 21 can vary as desired and, thus, the illustrated die sections 24*a* and 24*b* are shown for illustrative purposes only.

Initially, the hydroforming die assembly 21 is moved to an opened position (not shown), wherein the die sections 24*a* and 24*b* are spaced apart from one another. This orientation allows the workpiece 20 to be disposed between the spaced apart die sections 24*a* and 24*b*. Then, the hydroforming die assembly 21 is moved to a closed position (illustrated in FIG. 2), wherein the die sections 24*a* and 24*b* are moved into engagement with one another. As a result, some or all of the workpiece 20 is enclosed within the internal die cavity 25. Either before, during, or after the movement of the die sections 24*a* and 24*b* from the opened position to the closed position, the first and second end feed cylinders 22 and 23 are moved into engagement with the ends of the workpiece 20, as also shown in FIG. 2.

Figure 4:
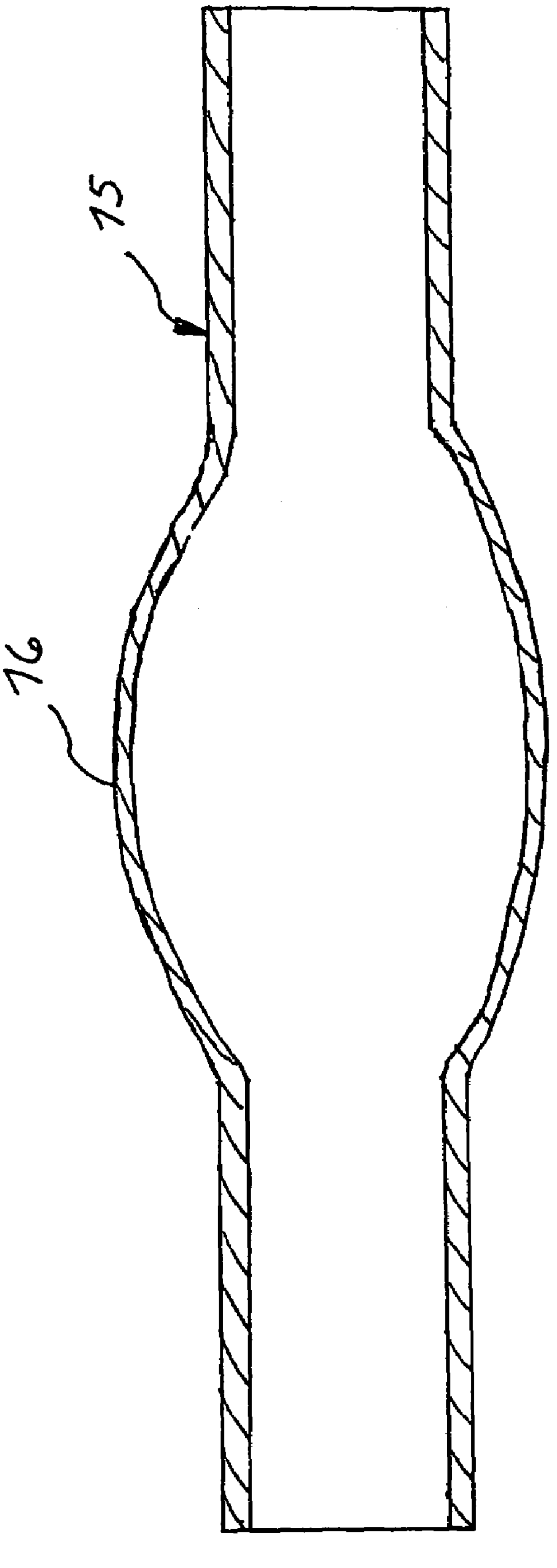
FIG. 4 is a sectional elevational view of the workpiece illustrated in FIG. 3 shown after being removed from the hydroforming die assembly.

Next, pressurized fluid is supplied though the passageway 23*a* formed through second end feed cylinder 23 into the interior of the workpiece 20. The pressure of the fluid within the workpiece 20 is increased in a well known manner to such a magnitude that the workpiece 20 is caused to expand outwardly in conformance with the internal die cavity 25 defined by the die assembly 21. As a result, the workpiece 20 is deformed into a desired final shape, such as shown in FIGS. 3 and 4, to form the pressure damper portion 15. Lastly, the workpiece 20 is removed from the die assembly 21, as shown in FIG. 4, to provide the pressure damper portion 15. It will be appreciated that for the sake of ease of visualization, the amount of expansion of the workpiece 20 that is illustrated in FIGS. 1 through 4 may be somewhat exaggerated relative to the actual amount of expansion of the workpiece 20 that actually occurs.

The enlarged region 16 of the pressure damper portion 15 is the result of the expansion of the workpiece 20 into the internal die cavity 25 that occurs during the hydroforming process described above. As shown in FIGS. 3 and 4, the wall thickness of the enlarged portion 16 of the pressure damper portion 15 is somewhat thinner than the wall thickness of the remaining, non-expanded portions of the pressure damper portion 15. This reduced wall thickness of the enlarged portion 16 occurs as a result of the expansion of the wall of the workpiece 20 during the hydroforming process. The thinner wall thickness of the enlarged region 16 of the pressure damper portion 15 resulting from the hydroforming process is desirable because, as described above, it is desirable that the enlarged region 16 of the pressure damper portion 15 be more flexible than the remaining, non-expanded portions of the pressure damper portion 15 to provide the desired pressure damping affect in a controlled manner.

Although the deformation of the workpiece 20 into the pressure damper portion 15 has been described using a hydroforming process, it will be appreciated that the workpiece 20 may be deformed by any other desired process, including magnetic pulse deformation techniques. Regardless of the manner in which it is formed, the final step in the method of this invention is to secure the pressure damper portion 15 to the secured to the fuel rail portion 11. This can be accomplished using any conventional process, such as by brazing, quick-connects, O-ring joints, welding, gluing, or magnetic pulse forming or welding techniques.

Figure 5:
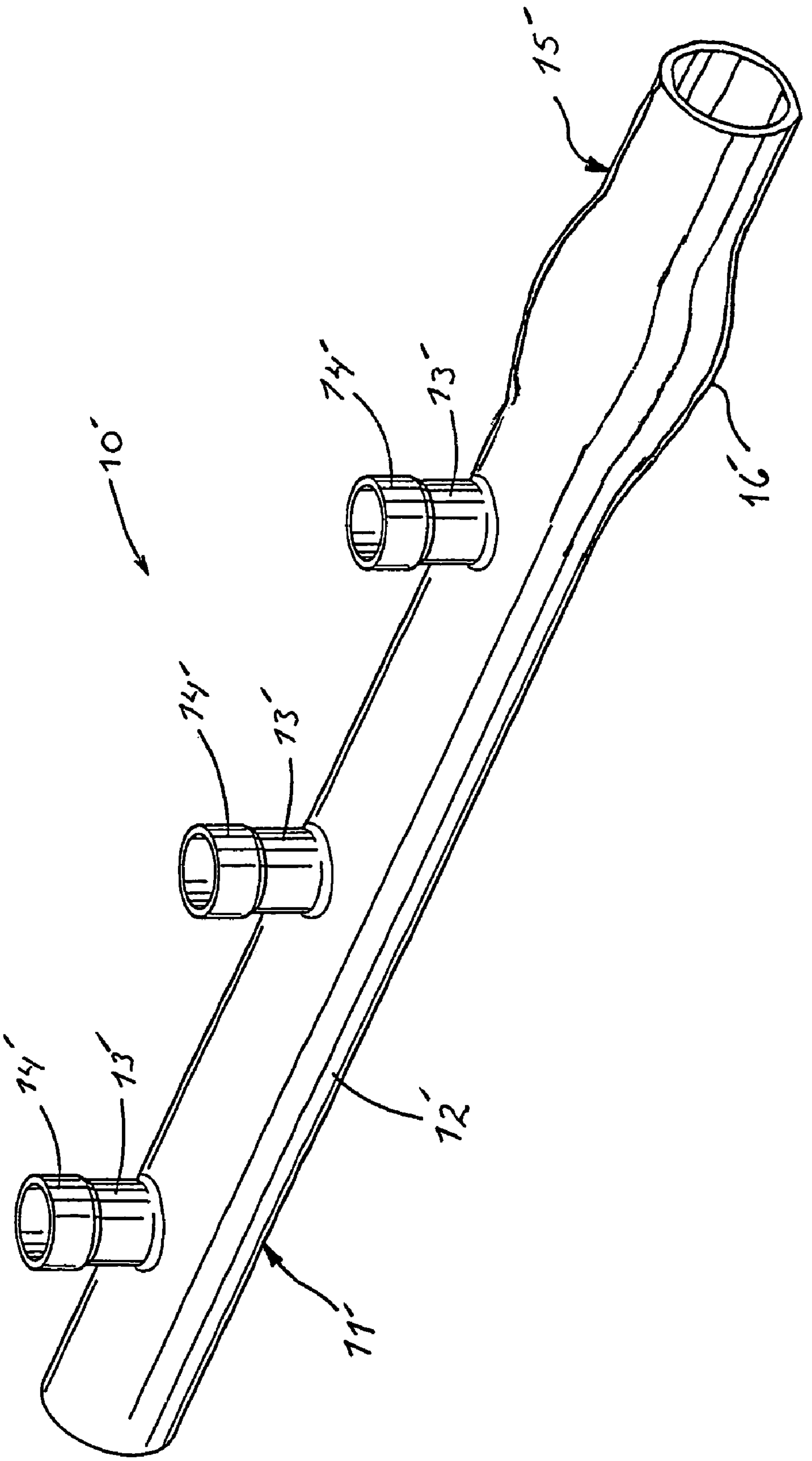
FIG. 5 is a perspective view of an integral fuel rail and pressure damper assembly that has been manufactured in accordance with a second embodiment of the method of this invention.

Referring now to FIG. 5, there is illustrated an integral fuel rail and pressure damper assembly, indicated generally at 10', that has been manufactured in accordance with the method of this invention. The integral fuel rail and pressure damper assembly 10' includes a fuel rail portion, indicated generally at 11', having a hollow body 12' and a plurality of nodes 13' extending outwardly from the hollow body 12'. Each of the nodes 13' terminates in an enlarged cup 14' that is adapted to receive a portion of a conventional fuel injector (not shown) therein in a known manner, although such is not required. The illustrated integral fuel rail and pressure damper assembly 10' also includes a pressure damper portion, indicated generally at 15', that is formed integrally (i.e., from the same piece of material) with the fuel rail portion 11'. The pressure damper portion 15' is generally hollow and communicates with the hollow body 12' of the fuel rail portion 11' such that fluid may be transmitted through the pressure damper portion 15' into the fuel rail portion 11'. The integral fuel rail and pressure damper assembly 10' can be manufactured using the hydroforming process described above or any other desired process. Thus, the nodes 13' and the cups 14' can be formed during the same hydroforming process as the reduced wall thickness enlarged portion 16'.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of manufacturing a combined fluid conduit and pressure damper assembly comprising the steps of:
(a) providing a workpiece;
(b) deforming the workpiece to provide an enlarged pressure damper portion having a reduced wall thickness region sufficient to flex elastically under certain pressure conditions and a non-reduced wall thickness region;
(c) providing a fluid conduit comprising a fuel rail; and
(d) securing the pressure damper portion to the fluid conduit to provide a combined fluid conduit and pressure damper assembly.

2. The method defined in claim 1 wherein said step (a) is performed by providing a tubular workpiece.

3. The method defined in claim 1 wherein said step (b) is performed by one of hydroforming and magnetic pulse forming.

4. The method defined in claim 1 wherein said step (c) is performed by providing a fuel rail including a plurality of nodes having respective cups.

5. The method defined in claim 1 wherein said step (d) is performed by one of brazing, quick-connects, O-ring joints, welding, gluing, or magnetic pulse forming or welding techniques.

6. The method defined in claim 1 wherein said step (a) is performed by providing a workpiece having a desired shape.

7. A method of manufacturing an integral fluid conduit and pressure damper assembly comprising the steps of:
(a) providing a workpiece; and
(b) deforming the workpiece to provide an enlarged pressure damper portion having a reduced wall thickness region sufficient to flex elastically under certain pressure conditions and a non-reduced wall thickness region and a fluid conduit portion comprising a fuel rail to provide an integral fluid conduit and pressure damper assembly.

8. The method defined in claim 7 wherein said step (a) is performed by providing a tubular workpiece.

9. The method defined in claim 7 wherein said step (b) is performed by one of hydroforming and magnetic pulse forming.

10. The method defined in claim 7 wherein said step (b) is performed by deforming the workpiece to provide the fluid conduit portion with a plurality of nodes having respective cups.

11. The method defined in claim 7 wherein said step (a) is performed by providing a workpiece having a desired shape.

* * * * *